(12) United States Patent
Hu et al.

(10) Patent No.: US 11,307,487 B2
(45) Date of Patent: Apr. 19, 2022

(54) LASER ILLUMINATION DEVICE AND PROJECTION SYSTEM USING THE SAME

(71) Applicant: APPOTRONICS CORPORATION LIMITED, Guangdong (CN)

(72) Inventors: Fei Hu, Shenzhen (CN); Zuqiang Guo, Shenzhen (CN); Peng Du, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 16/616,394

(22) PCT Filed: Aug. 1, 2017

(86) PCT No.: PCT/CN2017/095445
§ 371 (c)(1),
(2) Date: May 26, 2020

(87) PCT Pub. No.: WO2018/214283
PCT Pub. Date: Nov. 29, 2018

(65) Prior Publication Data
US 2020/0301264 A1    Sep. 24, 2020

(30) Foreign Application Priority Data
May 24, 2017 (CN) .......................... 201710373062.0

(51) Int. Cl.
*G03B 21/20* (2006.01)
*H05B 47/155* (2020.01)
(Continued)

(52) U.S. Cl.
CPC .......... *G03B 21/2033* (2013.01); *F21V 5/004* (2013.01); *G03B 21/2053* (2013.01);
(Continued)

(58) Field of Classification Search
None
See application file for complete search history.

(56) References Cited

U.S. PATENT DOCUMENTS

| | | | |
|---|---|---|---|
| 4,733,944 A | 3/1988 | Fahlen et al. | |
| 2009/0091713 A1* | 4/2009 | Shirai | G02B 26/0841 353/31 |

(Continued)

FOREIGN PATENT DOCUMENTS

| | | |
|---|---|---|
| CN | 1841183 A | 10/2006 |
| CN | 101393382 A | 3/2009 |

(Continued)

OTHER PUBLICATIONS

International Search Report of corresponding Patent Application No. PCT/CN2017/095445—6 pages (dated Nov. 10, 2017).
(Continued)

*Primary Examiner* — Michelle M Iacoletti
*Assistant Examiner* — Danell L Owens
(74) *Attorney, Agent, or Firm* — Knobbe, Martens, Olson & Bear LLP

(57) ABSTRACT

A laser illumination device and a projection system including the same. The laser illumination device includes a laser source, a light combining assembly, a micro-lens assembly, and a plurality of cylindrical lens assemblies; the plurality of cylindrical lens assemblies are provided in a light transmission path of the laser source; the micro-lens assembly is mounted at one side of the light combining assembly; each cylindrical lens assembly includes a first cylindrical lens array and a second cylindrical lens array; and the first cylindrical lens array and the second cylindrical lens array form a preset angle.

18 Claims, 5 Drawing Sheets

(51) Int. Cl.
*F21V 5/00* (2018.01)
*H04N 9/31* (2006.01)

(52) U.S. Cl.
CPC ....... *G03B 21/2066* (2013.01); *H04N 9/3129* (2013.01); *H05B 47/155* (2020.01)

(56) References Cited

U.S. PATENT DOCUMENTS

| | | | | |
|---|---|---|---|---|
| 2010/0321596 | A1* | 12/2010 | Ishikura | G03B 33/06 349/5 |
| 2016/0062223 | A1 | 3/2016 | Akiyama | |
| 2016/0198135 | A1* | 7/2016 | Kita | G02B 27/48 348/756 |
| 2016/0363851 | A1* | 12/2016 | Takahara | G02B 27/102 |
| 2017/0118452 | A1* | 4/2017 | Ogi | H04N 9/3182 |

FOREIGN PATENT DOCUMENTS

| | | |
|---|---|---|
| CN | 102221768 A | 10/2011 |
| CN | 102455513 A | 5/2012 |
| CN | 102455581 A | 5/2012 |
| CN | 202306115 U | 7/2012 |
| CN | 102929087 A | 2/2013 |
| CN | 104749863 A | 7/2015 |
| CN | 104796650 A | 7/2015 |
| CN | 105467733 A | 4/2016 |
| CN | 105573033 A | 5/2016 |
| CN | 105573036 A | 5/2016 |
| CN | 105575304 A | 5/2016 |
| CN | 105589288 A | 5/2016 |
| CN | 105612739 A | 5/2016 |
| CN | 105991980 A | 10/2016 |
| CN | 106125479 A | 11/2016 |
| CN | 106257329 A | 12/2016 |
| CN | 206095585 U | 4/2017 |
| EP | 0232037 A2 | 8/1987 |
| WO | WO 2009/032341 A1 | 3/2009 |

OTHER PUBLICATIONS

Office Action in CN 201710373062.0, dated Mar. 16, 2020.
2$^{nd}$ Office Action in CN 201710373062.0, dated Aug. 10, 2020.
First Search Report in CN 201710373062.0, dated Mar. 8, 2020.
Supplemental Search in CN 201710373062.0, dated Jul. 31, 2020.
Supplemental Search in CN 201710373062.0, dated Apr. 28, 2021.

\* cited by examiner

LASER ILLUMINATION DEVICE AND PROJECTION SYSTEM USING THE SAME

CROSS REFERENCE TO RELATED APPLICATIONS

This is a U.S. National Stage Application, filed under 35 U.S.C. 371, of International Patent Application No. PCT/CN2017/095445, filed on Aug. 1, 2017, which claims priority to Chinese patent application No. 201710373062.0 filed on May 24, 2017, contents of both of which are incorporated herein by reference in their entireties

TECHNICAL FIELD

The present disclosure relates to the field of light sources, and more particularly, to a laser illumination device and a projection system using the laser illumination device.

BACKGROUND

Currently, a projection display technology has an increasingly wide range of applications. Since laser light has advantages of a high energy density and a small etendue and can provide a light source having high luminance and a long service life, which reduces design difficulty of an optical system, the laser light gradually replaces traditional light bulbs and LED light sources in the field of projection display. An existing projection system can only perform color projection by means of a color wheel, which increases a volume of the projection system. Moreover, a laser needs to continuously excite phosphors of different materials at a high power to obtain fluorescence of three primary colors, such that power consumption of the projection system is high, and it is impossible to output uniform rectangular light.

SUMMARY

The present disclosure provides a laser illumination device for a projection system, including: a laser light source, a light combining assembly, a micro-lens assembly and a plurality of cylindrical lens assemblies. The micro-lens assembly is provided on a side of the light combining assembly, and the plurality of cylindrical lens assemblies is provided in an optical path for transmission of the laser light source. Each of the plurality of cylindrical lens assemblies includes a first cylindrical lens array and a second cylindrical lens array, and a preset angle of intersection is formed between the first cylindrical lens array and the second cylindrical lens array, and the laser light source achieves grayscale output of the projection system for a corresponding pixel point by adjusting luminance of the laser light source.

The present disclosure further provides a projection system including the above laser illumination device, the projection system further includes a diffuser, a square rod assembly, a light relay assembly, a light modulation assembly and an output assembly, the diffuser is provided in an optical path, along which the laser illumination device transmit a laser beam outwards, the square rod assembly is provided on one side of the diffuser facing away from the laser illumination device, the light relay assembly is provided between the square rod assembly and the light modulation assembly, and the output assembly is provided in an optical path, along which the light modulation assembly transmits a modulated laser beam outwards. The light modulation assembly is configured to adjust output luminance of the laser light source corresponding to each pixel point in an image signal, and to control the laser light source to achieve grayscale output of the projection system for a corresponding pixel point by adjusting luminance of the laser light source.

The laser illumination device of the present disclosure is provided with a cylindrical lens assembly in an optical path for transmission of the laser light source to converge a non-uniform laser beam into a uniform rectangular laser beam which is converted by a micro-lens assembly so as to converge the diverging laser beam into a parallel laser light beam, and thereby outputting a uniform parallel matrix laser beam. The laser illumination device has a compact structure and a low energy consumption. The projection system of the present disclosure can realize projection imaging of pictures and videos with a high dynamic range and has good economic benefits.

REFERENCE SIGNS OF MAIN COMPONENTS

Figure 1:
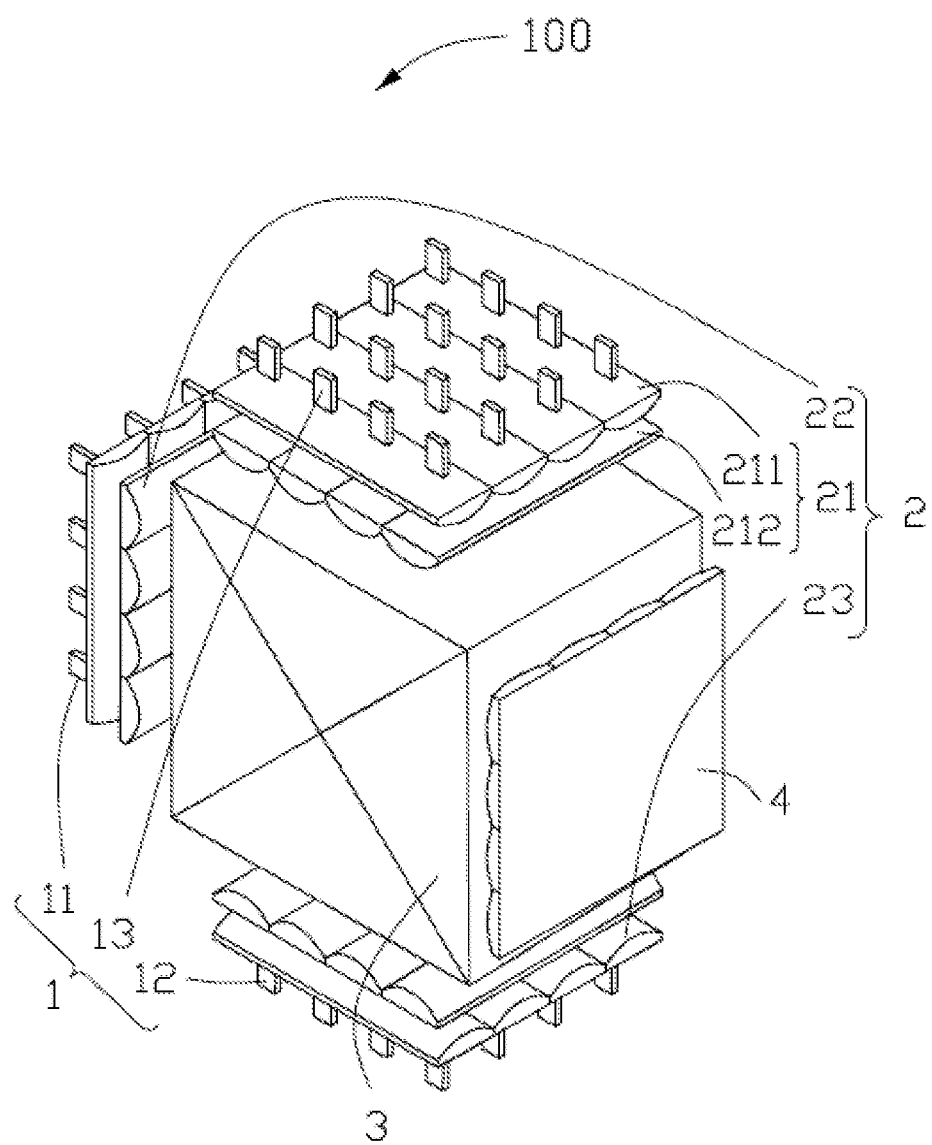
FIG. 1 is a perspective schematic diagram of a laser illumination device in accordance with an embodiment of the present disclosure.

Laser illumination device 100
Laser light source 1
Red light source 11
Green light source 12
Blue light source 13
Cylindrical lens assembly 2
Red light cylindrical lens assembly 21
First cylindrical lens array 211
Second cylindrical lens array 212
Green light cylindrical lens assembly 22
Blue light cylindrical lens assembly 23
Light combining assembly 3
Micro-lens assembly 4
Projection system 200, 200a, 200b
Diffuser 20
Square rod assembly 30
Light relay assembly 40
Light modulation assembly 50
Spatial light modulator 51
Output assembly 60
Imaging object lens 61
Scanning mirror 62
LCD modulator 71
PBS plate 72
Reflector assembly 73
First reflector 731

Second reflector 732
Half-wave plate 74
Relay lens 75
Light combining mirror 76
AR-coating film 761
High-reflective film 762

The present disclosure will be further illustrated by the following detailed description in conjunction with the accompanying drawings.

DESCRIPTION OF EMBODIMENTS

Hereinafter, technical solutions in embodiments of the present disclosure will be clearly and completely described with reference to the drawings in the embodiments of the present disclosure. It is apparent that the described embodiments are only part of the embodiments of the present disclosure but not all of the embodiments. All other embodiments obtained by those skilled in the art based on the embodiments of the present disclosure without creative efforts are within the scope of the present disclosure.

It should be noted that when an assembly is referred to as being "provided on" another assembly, it can be directly on the other assembly or there is an intermediate assembly therebetween.

All technical and scientific terms used herein have the same meaning as commonly understood by one of ordinary skill in the art to which this present disclosure belongs, unless otherwise defined. The terms used in the description of the present disclosure are for the purpose of describing particular embodiments and are not intended to limit the present disclosure. The term "and/or" as used herein includes any and all combinations of one or more of the associated items listed.

Referring to FIG. 1, FIG. 1 is a perspective schematic diagram of a laser illumination device according to an embodiment of the present disclosure. The laser illumination device 100 serves as an illumination light source for outputting uniform parallel matrix light. The laser illumination device 100 includes a laser light source 1, a cylindrical lens assembly 2, a light combining assembly 3, and a micro-lens assembly 4. The cylindrical lens assembly 2 is provided in an optical path for transmission of the laser light source 1. The micro-lens assembly 4 is provided on one side of the light combining assembly 3. The laser light source 1 is configured to output an illumination laser beam. The cylindrical lens assembly 2 is configured to converge the illumination laser beam so as to converge a non-uniform laser beam into a uniform matrix laser beam. The light combining assembly 3 is configured to combine a plurality of laser beams into one laser beam to increase power and light energy density of the laser beam. The micro-lens assembly 4 is configured to convert a divergent laser beam into a parallel linear laser beam so as to output uniform parallel matrix laser light.

The laser light source 1 is composed of laser chips arranged in an array. The laser light source 1 includes a red light source 11 that outputs red laser light, a green light source 12 that outputs green laser light, and a blue light source 13 that outputs blue laser light. The laser beams output from the red light source 11, the green light source 12, and the blue light source 13 are superimposed on each other to output colors based on a RGB mode. In this embodiment, a wavelength of the red laser light output by the red light source 11 is 638 nm. A wavelength of the green laser light output by the green light source 12 is 520 nm. A wavelength of the blue laser light output by the blue light source 13 is 455 nm. The red light source 11, the green light source 12, and the blue light source 13 are distributed in a shape of "品" and surround the light combining assembly 3.

It can be understood that the wavelength of the laser beam output by the red light source 11 is not limited to 638 nm in the present embodiment, and other wavelengths are possible; the wavelength of the laser beam output by the green light source 12 is not limited to 520 nm in the present embodiment, and other wavelengths are possible; the wavelength of the laser beam output by the blue light source 13 is not limited to 455 nm in the present embodiment, and other wavelengths are possible.

The cylindrical lens assembly 2 includes a red light cylindrical lens assembly 21 provided in an optical path of the red light source 11, a green light cylindrical lens assembly 22 provided in an optical path of the green light source 12, and a blue light cylindrical lens assembly 23 provided in an optical path of the blue light source 13. The red light cylindrical lens assembly 21 is configured to homogenize the laser beam emitted by the red light source 11. The green light cylindrical lens assembly 22 is configured to homogenize the laser beam emitted by the green light source 12. The blue light cylindrical lens assembly 23 is configured to homogenize the laser beam emitted by the blue light source 13. The red light cylindrical lens assembly 21 includes a first cylindrical lens array 211 and a second cylindrical lens array 212. A preset angle of intersection is formed between a central axis of the first cylindrical lens array 211 and a central axis of the second cylindrical lens array 212. In this embodiment, the central axis of the first cylindrical lens array 211 and the central axis of the second cylindrical lens array 212 are perpendicular to each other.

In a current packaging process of a laser, a rotationally symmetric lens is typically used to collimate output light of a laser chip, such that spatial distribution of the output light is of a rectangle shape, and divergence angles of the output light in two orthogonal directions are different, rendering non-uniform laser distribution of a rectangle shape.

Figure 2:
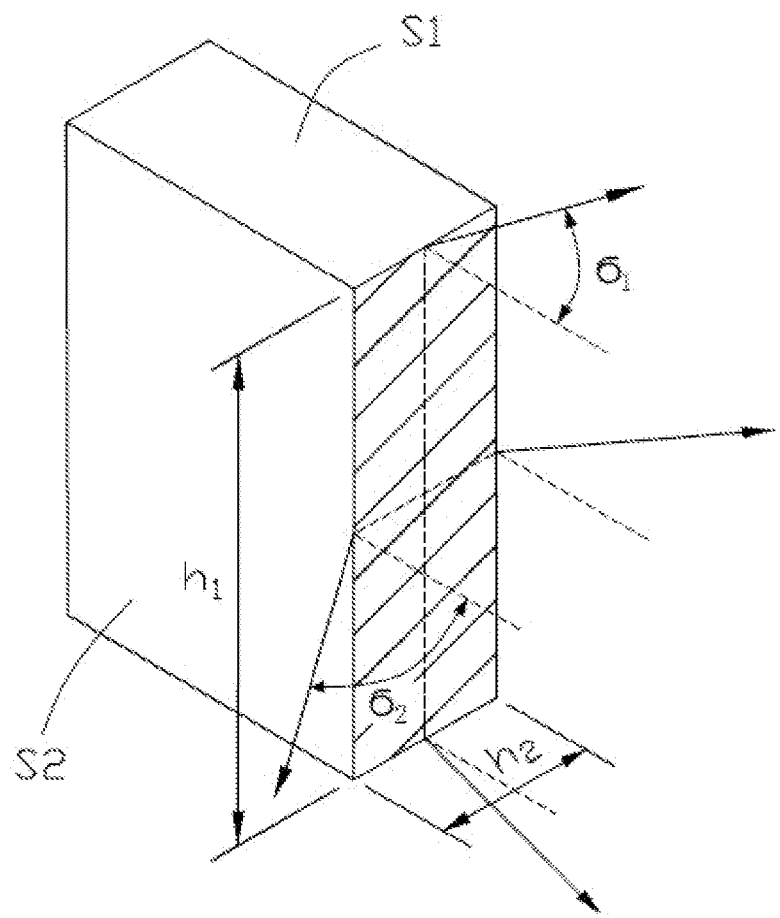
FIG. 2 is a schematic diagram showing a spatial distribution of a laser beam emitted from a laser light source.

Referring to FIG. 2, FIG. 2 is a schematic diagram of the spatial distribution of the laser beam emitted by the laser light source 1. The spatial distribution of the laser beam emitted by the laser light source 1 is of a rectangle shape, and the angular distribution of the laser beam emitted by the laser light source 1 is a Gaussian distribution with different angles σ in two orthogonal directions. For convenience of description, a dimension of the rectangle in a length direction is $h_1$, and a dimension in a width direction is $h_2$. A horizontal plane including the width of the spatial distribution of the rectangle shape of the laser beam is denoted as $S_1$, and a vertical plane including the length of the spatial distribution of the rectangle shape of the laser beam is denoted as $S_2$. The divergence angle formed by the laser beam with respect to the surface $S_1$ is σ1, and the divergence angle formed by the laser beam with respect to the surface $S_2$ is σ2.

The first cylindrical lens array 211 and the second cylindrical lens array 212 are configured to adjust the divergence angles of the laser beam, such that the divergence angles of the laser beam in the two orthogonal directions are the same, so as to present a uniform matrix light. A focal length of the first cylindrical lens array 211 is $f_1$, and a focal length of the second cylindrical lens array 212 is $f_2$. After being focused by the first cylindrical lens array 211 and the second cylindrical lens array 212, the dimension $h_1$ in the length direction and the dimension $h_2$ in the width direction of the spatial distribution of the laser beam satisfy:

$$h_1 = f_1 \times \tan \sigma_1,$$

$$h_2 = f_2 \times \tan \sigma_2.$$

The focal lengths of the first cylindrical lens array 211 and the second cylindrical lens array 212 are configured in such a way that they satisfy:

$$\frac{h_1}{f_1} = \frac{h_2}{f_2}.$$

Then, the divergence angle $\sigma_1$ formed by the laser beam with respect to the surface $S_1$ and the divergence angle $\sigma_2$ formed by the laser beam with respect to the surface $S_2$ satisfy: $\sigma_1 = \sigma_2$. Since the length $h_1$ of the laser beam is larger than the width $h_2$ thereof, the focal length $f_1$ of the first cylindrical lens array 211 is larger than the focal length $f_2$ of the second cylindrical lens array 212. After being focused by the first cylindrical lens array 211 and the second cylindrical lens array 212, the divergence angles of the laser beam in the two orthogonal directions are the same, and the laser beam is converted into a uniform matrix light.

In this embodiment, the laser beam emitted by the laser light source 1 first passes through the second cylindrical lens array 212 focusing the width h2 of the laser beam and then passes through the first cylindrical lens array 211 focusing the length h1 of the laser beam.

It will be appreciated that the second cylindrical lens array 212 focusing the width h2 of the laser beam may also be arranged behind the first cylindrical lens array 211 focusing the length h1 of the laser beam.

The structures of the green light cylindrical lens assembly 22 and the blue light cylindrical lens assembly 23 are the same as the assembly and structure of the red light cylindrical lens assembly 21, which will not be described herein.

The light combining assembly 3 is substantially disposed at a center of an annular distribution of the laser light source 1 and the cylindrical lens assembly 2. The light combining assembly 3 is configured to combine a plurality of laser beams into one laser beam so as to increase the power and the light energy density of the laser beam. The light combining assembly 3 is composed of a combination of filters.

The micro-lens assembly 4 is disposed in an optical path of the combined laser beam output by the light combining assembly 3, and the micro-lens assembly 4 is configured to convert a divergent laser beam into a parallel laser beam. The micro-lens assembly 4 may be an existing refractive type micro-lens array or an existing diffractive type micro-lens array.

Figure 3:
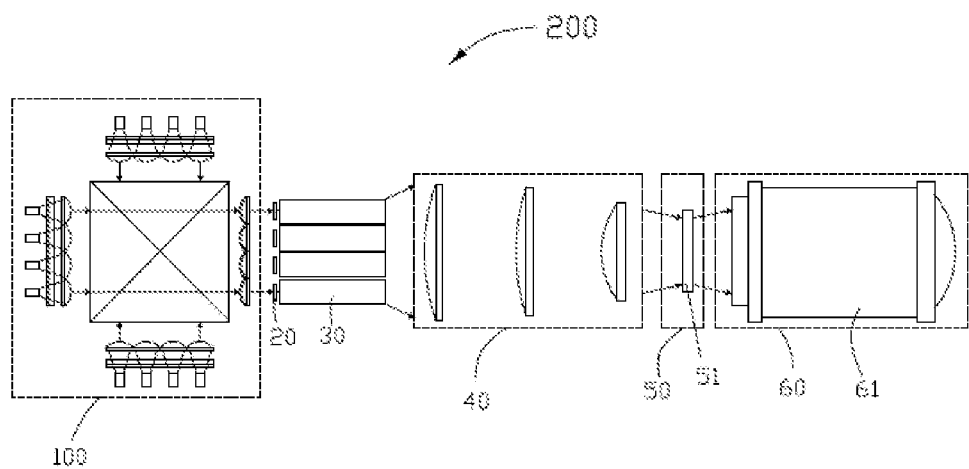
FIG. 3 is a structural schematic diagram of a projection system in accordance with a first embodiment of the present disclosure.

The present disclosure also provides a projection system 200 including the laser illumination device 100 described above. Referring to FIG. 3, FIG. 3 is a structural schematic diagram of the projection system 200 according to the first embodiment of the present disclosure. The projection system 200 is used for projection display of images or videos. The projection system 200 includes a laser illumination device 100, a diffuser 20, a square rod assembly 30, a light relay assembly 40, a light modulation assembly 50, and an output assembly 60.

The diffuser 20 is provided in an optical path of the laser beam that is transmitted outward by the micro-lens assembly 4 in the light illuminating device 100. The square rod assembly 30 is disposed on one side of the diffuser 20 facing away from the laser illumination device 100. The light relay assembly 40 is disposed between the square rod assembly 30 and the light modulation assembly 50. The output assembly 60 is provided in the optical path of the modulated laser beam transmitted outward by the light modulation assembly 50. The laser illumination device 100 is configured to output uniform parallel matrix light. The diffuser 20 is configured for eliminating coherence of the laser beam and suppressing a speckle phenomenon of laser imaging. The square rod assembly 30 is configured to homogenize the intensity of the laser beam in space, such that the incident laser beam has its original interference can be destroyed by being reflected in the square rod assembly 30 for many times, thereby obtaining a laser beam of uniform intensity distribution at a light-exit end of the square rod assembly 30. The light relay assembly 40 is configured to transmit the laser beam and image the laser beam emitted from the square rod assembly 30 on the light modulation assembly 50. The light modulation assembly 50 is configured for modulating the laser beam. In this embodiment, the light modulation assembly 50 is a spatial light modulator 51, and the spatial light modulator 51 is controlled by an image signal, for modulating the spatial distribution of the laser beam. The output assembly 60 is configured to output the laser beam and transmit the laser beam to an external screen. In the embodiment, the output assembly 60 is an imaging object lens 61.

The matrix light output by the laser illumination device 100 is decohered by the diffuser 20 and homogenized by the square rod assembly 30, then imaged on the light modulation assembly 50 by the light relay assembly 40, and then modulated by the light modulation assembly 50 and transmitted by the output assembly 60 to the external projection screen so as to achieve projection imaging.

The projection system 200 realizes projection imaging with a high dynamic range in accordance with an intensity modulation algorithm that modulates the laser light source 1 in the laser illumination device 100, so that the projection imaging can clearly display details of dark portions or highlight portions. The intensity modulation algorithm acquires grayscale distribution of the image signal required to be projected according to the spatial light modulator 51, controls luminance of the pixel point correspondingly controlled by the respective laser chip, and dynamically modulates the intensity of the excitation light of the laser light source 1 in the laser illumination device 100, thereby achieves projection imaging of the high dynamic range.

Taking an 8-bit spatial light modulator as an example, it is capable of realizing light modulation in a grayscale range of 0-255. In a certain image signal, if a maximum luminance that the laser light source 1 can output is denoted as $I_{max}$, and a grayscale value of the pixel point having the highest luminance obtained by a maximum value algorithm is A, and a grayscale value of a certain pixel point in the image signal is a, then a luminance $I_a$ of the laser light source 1 corresponding to the certain pixel point is calculated according to a formula of $$I_a = I_{max} \times \frac{a}{A}.$$

For example, when a grayscale of the pixel point having the highest luminance in a certain image signal is 200 and a grayscale of a certain pixel point is 100, a luminance output to the certain pixel by the laser light source 1 is $$I_{max} \times \frac{1}{2}.$$

In the present embodiment, the grayscale value of the pixel point having the highest luminance is obtained by the maximum value algorithm.

It can be understood that obtaining the grayscale value of the pixel point having the highest luminance is not limited to the maximum value algorithm in the present embodiment, and other algorithms, such as cycle comparison for solving a minimum or maximum value, can also be configured to obtain the grayscale value of the pixel point having the highest luminance.

In the present embodiment, a gray level of the spatial light modulator 51 is of an 8-bit gray level.

It can be understood that the gray level of the spatial light modulator 51 is not limited to 8-bit in the present embodiment, and it may be other digits, such as 4-bit, 6-bit, and the like.

According to the algorithm and the modulation process, it can be ensured that the luminance output by the laser light source 1 is constant for the pixel point having the highest luminance of each frame of the image signal, i.e., $I_{max}$. A luminance output to a pixel point having lowest luminance is $$I_a = I_{max} \times \frac{a}{A},$$

which dynamically improves the contrast and achieves the projection imaging with a high dynamic range; since the luminance of other dark pixels are lowered by reducing the intensity of the laser light source 1, the power consumption and loss of the laser light source 1 can be reduced.

Figure 4:
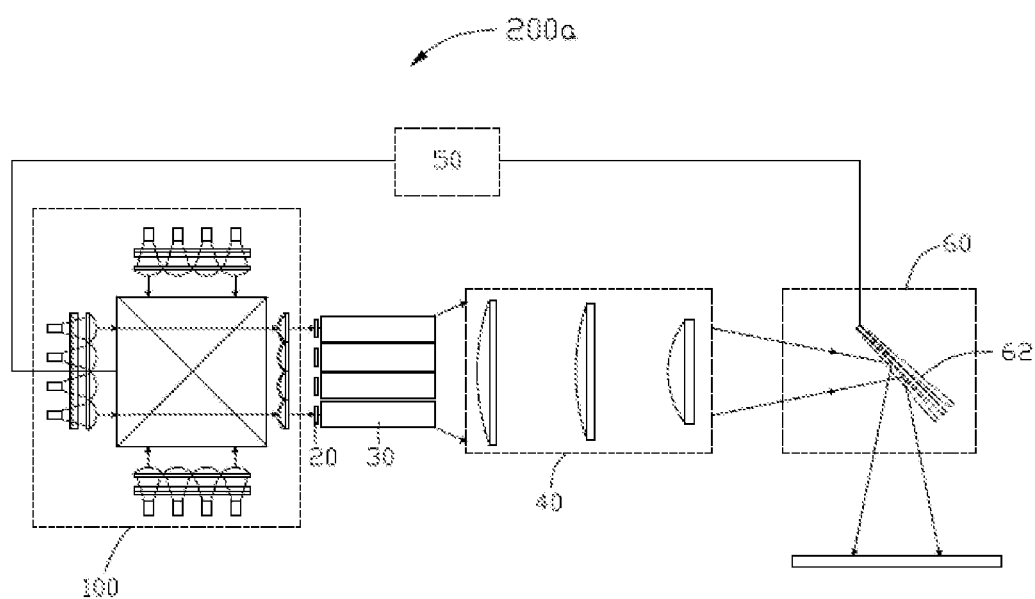
FIG. 4 is a structural schematic diagram of a projection system in accordance with a second embodiment of the present disclosure.

Referring to FIG. 4, FIG. 4 is a structural schematic diagram of a projection system 200a according to a second embodiment of the present disclosure. The projection system 200 is used for projection display of images and videos. The projection system 200a includes a laser illumination device 100, a diffuser 20, a square rod assembly 30, a light relay assembly 40, a light modulation assembly 50, and an output assembly 60.

The structure and connection relationship of the laser illumination device 100, the diffuser 20, the square rod assembly 30, and the light relay assembly 40 are the same as the structure and connection relationship of the laser illumination device 100, the diffuser 20, the square rod assembly 30 and the light relay assembly 40 in the first embodiment of the present disclosure, which will not be described herein. The light modulation assembly 50 is disposed between the output assembly 60 and the laser illumination device 100. The light modulation assembly 50 modulates the light intensity based on the image signal obtained by the output assembly 60. The output assembly 60 is provided in the optical path for transmission of the light relay assembly 40. In the present embodiment, the output assembly 60 is a scanning mirror 62. The scanning mirror 62 is configured to scan signals of different pixel-composing-regions on the external projection screen. After the scanning mirror 62 in the output assembly 60 acquires signals of different pixel points on the external projection screen, the light modulation assembly 50 synchronously controls the laser light source 1 in the laser illumination device 100 to modulate the light intensity.

Figure 5:
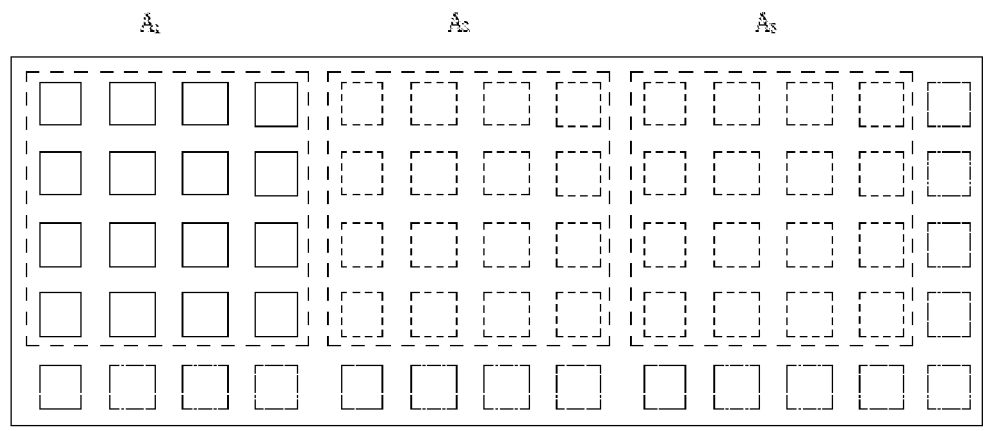
FIG. 5 is a schematic diagram of scanning an image signal by a scanning mirror.

Referring to FIG. 5, FIG. 5 is a schematic diagram of scanning an image signal by the scanning mirror 62. The scanning mirror 62 sequentially scans different pixel regions on the same horizontal scanning line, for example, scanning an $A_1$ region first, and then sequentially scanning $A_2$, $A_3$ regions, and so on. At a certain moment, if an RGB signal of the $A^1$ region pixel point in a picture and video signal acquired by the scanning mirror 62 is (x, y, z), then the light modulation assembly 50 controls the laser light source 1 in the laser illumination device 100 to output a light intensity according to the acquired RGB signal. A light intensity of the red laser light output by the red light source 11 is $I_R*x/I_L$. A light intensity of the green laser light output by the green light source 12 is $I_G*y/I_L$. A light intensity of the blue laser light output by the blue light source 13 is $I_B*z/I_L$. $I_R$ is the maximum light intensity of the red laser light output by the red light source 11. $I_G$ is the maximum light intensity of the green laser light output by the green light source 12. $I_B$ is the maximum light intensity of the blue laser light output by the blue light source 13. $I_L$ is a maximum grayscale of the laser light source 1, and the maximum grayscale is determined by the number of bits of the gray level of the laser light source 1.

In this embodiment, if the laser light source 1 is of an 8-bit gray level, and a maximum grayscale $I_L$ of the corresponding laser light source 1 is 255. A light intensity of the red laser light output by the red light source 11 is $I_R*x/255$, a light intensity of the green laser light output by the green light source 12 is $I_G*y/255$, and a light intensity of the blue laser light output by the blue light source 13 is $I_B*Z/255$.

For example, at a certain moment, the RGB signal of the $A_1$ region pixel point acquired by the scanning mirror 62 is (50, 100, 150), then the light modulation assembly 50 controls the laser light source 1 in the laser illumination device 100 to output the light intensity according to the acquired RGB signal. A light intensity of the red laser light output from the red light source 11 is $I_R*50/255$, a light intensity of the green laser light output from the green light source 12 is $I_R*100/255$, and a light intensity of the blue laser light output from the blue light source 13 is $I_B*150/255$.

It can be understood that the gray level of the laser light source 1 is not limited to 8-bit in the embodiment, and it may be of other bits, such as 4-bit, 6-bit, and the like.

After the laser light source 1 outputs the laser beam of the $A_1$ region pixel point, the scanning mirror 62 scans an RGB signal of the $A_2$ region pixel point, and the laser light source 1 and the scanning mirror 62 sequentially complete signal scanning and light intensity output of all region pixel points under the control of the light modulation assembly 50, thereby realizing projection imaging of image and video signals.

Figure 6:
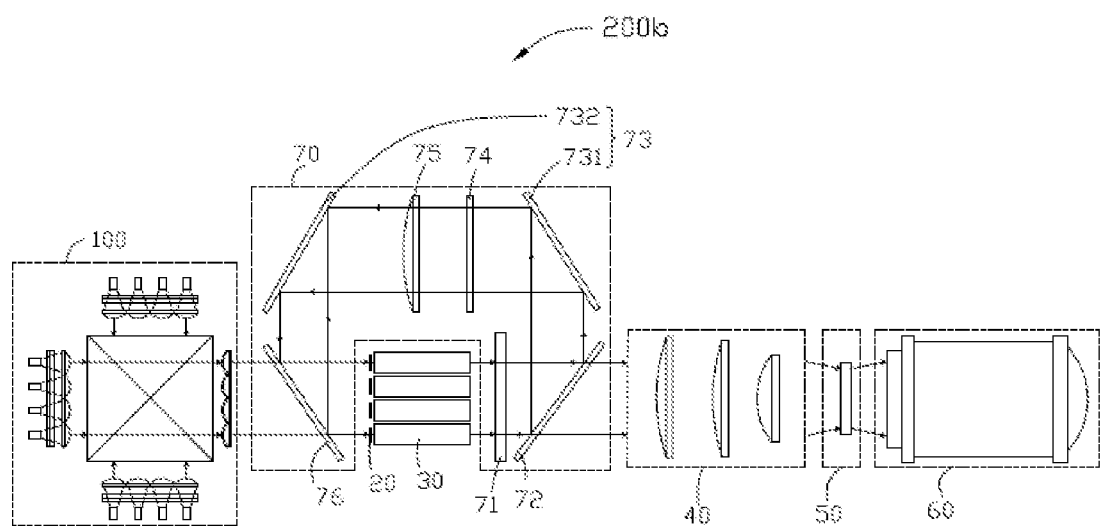
FIG. 6 is a structural schematic diagram of a projection system in accordance with a third embodiment of the present disclosure.

Referring to FIG. 6, FIG. 6 is a structural schematic diagram of a projection system 200b according to a third embodiment of the present disclosure. The projection system 200b is used for projection display of images and videos. The projection system 200b includes a laser illumination device 100, a diffuser 20, a square rod assembly 30, a light relay assembly 40, a light modulation assembly 50, an output assembly 60, and a light recycling assembly 70.

The structure and connection relationship of the laser illumination device 100, the diffuser 20, the square rod assembly 30, the light relay assembly 40, the light modulation assembly 50, and the output assembly 60 are the same as the structure and the connection relationship of the laser illumination device 100, the diffuser 20, the square rod assembly 30, the light relay assembly 40, the light modulation assembly 50, and the output assembly 60 in the first embodiment of the present disclosure, which will not be described herein.

The light recycling assembly 70 is configured to recycle S-polarized light that cannot be used for illumination in the optical path, convert the S-polarized light into P-polarized light, and then re-inject the P-polarized light into the optical path, thereby improving the utilization efficiency of the laser beam energy. The light recycling assembly 70 includes an LCD modulator 71, a PBS plate 72, a reflector assembly 73, a half-wave plate 74, a relay lens 75, and a light combining mirror 76. The reflector assembly 73 includes a first reflector 731 and a second reflector 732. The LCD modulator 71 and the PBS plate 72 are sequentially disposed between the square rod assembly 30 and the light relay assembly 40. The half-wave plate 74 and the relay lens 75 are sequentially disposed between the first reflector 731 and the second reflector 732, and the light combining mirror 76 is provided between the laser illumination device 100 and the square rod assembly 30.

The LCD modulator 71 is configured to modulate the laser beam emitted from the square rod assembly 30, and the laser beam emitted from the square rod assembly 30 has two components which are P-polarized light for illumination and S-polarized light that cannot be used for illumination. The PBS plate 72 is configured to filter the P-polarized light and reflect the S-polarized light, and the P-polarized light for illumination passes through the PBS plate 72 and continues to be transmitted to the light relay assembly 40, while the S-polarized light that cannot be used for illumination is reflected by the PBS plate and transmitted to the first reflector 731. The first reflector 731 reflects the S-polarized light such that the S-polarized light sequentially passes through the half-wave plate 74 and the relay lens 75. The half-wave plate 74 is configured to convert the S-polarized light into P-polarized light, and the relay lens 75 is configured to recycle a laser waveform distorted during light transmission. At this time, the S-polarized light emitted from the square rod assembly 30 is converted into P-polarized light, and then transmitted to the second reflector 732 after the waveform is recycled by the relay lens 75. The recycled P-polarized light is reflected by the second reflector 732 to the light combining mirror 76. The light combining mirror 76 combines the P-polarized light with the laser light emitted from the laser illumination device 100, and transmits it to the square rod assembly 30, thereby realizing light recycling and increasing the utilization efficiency of the light energy.

Figure 7:
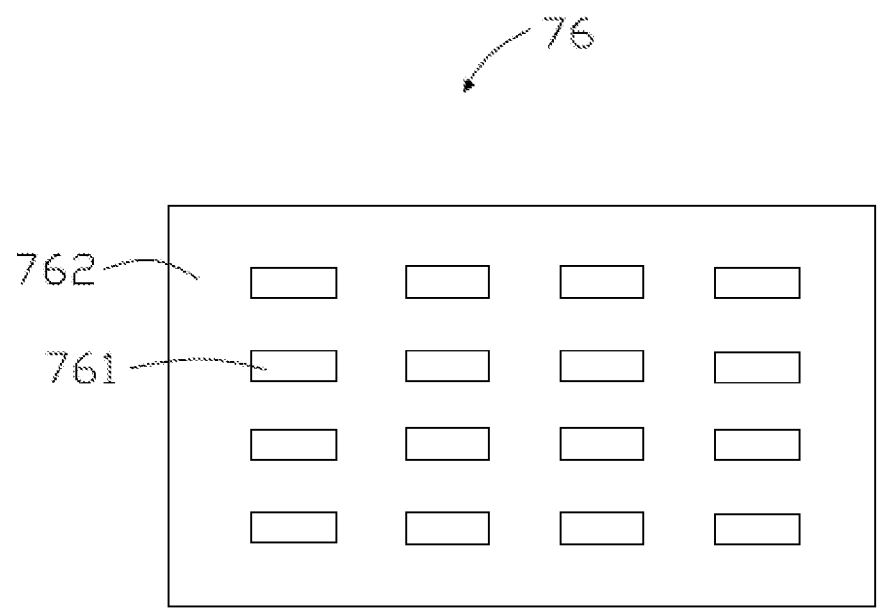
FIG. 7 is a structural schematic diagram of a light combining mirror.

Referring to FIG. 7 in conjunction, FIG. 7 is a structural schematic diagram of the light combining mirror 76. The light combining mirror 76 is configured to combine the converted P-polarized light and the parallel matrix light emitted from the laser illumination device 100. The light combining mirror 76 includes an AR-coating film 761 and a high-reflective film 762. The AR-coating film 761 is embedded in the high-reflective film 762. The parallel matrix light emitted by the laser illumination device 100 directly passes through the AR-coating film 761 and is transmitted forward, while the P-polarized light is transmitted forward under the reflection effect of the high-reflective film 762, and the parallel matrix light and the P-polarized light that are transmitted forward are combined in an etendue-combining manner, so as to achieve, by the light recycling assembly 70, recycling of the S-polarized light that cannot be used for illumination.

The projection system 200b can modulate the light intensity output by the laser light source 1 and the LCD modulator 71 in conjunction with an intensity modulation algorithm, to achieve projection imaging with a high dynamic range. The intensity modulation algorithm acquires, via the spatial light modulator 51, a luminance distribution of the image signal to be projected. The intensity of the light output by the laser light source 1 and the LCD modulator 71 is dynamically modulated according to the luminance distribution of the image signal to be projected, to realize projection imaging with a high dynamic range.

Both the spatial light modulator 51 and the LCD modulator 71 can output grayscale within a certain range. In a certain image signal, a maximum luminance that can be output by the laser light source 1 is denoted as $I_{max}$, and a grayscale value of the pixel point having the highest luminance is obtained by a maximum value algorithm; if a grayscale value of a certain pixel point is a, then a luminance $I_a$ of the laser light source 1 corresponding to the certain pixel point is calculated according to a formula of $$I_a = I_{max} \times \frac{a}{A},$$

and a luminance $I_b$ of the LCD modulator 71 corresponding to the certain pixel point is calculated according to a formula of $$I_b = I_M \times \frac{a}{A}.$$

$I_M$ is a maximum grayscale of the LCD modulator 71, and the maximum grayscale is determined by the number of bits of the gray level of the LCD modulator 71.

In this embodiment, the LCD modulator 71 is of an 8-bit gray level, and a corresponding maximum grayscale $I_M$ of the LCD modulator 71 is 255. A luminance $I_b$ of the LCD modulator 71 is calculated according to the formula of $$I_b = 255 \times \frac{a}{A}.$$

For example, when a grayscale of the pixel point having the highest luminance in a certain image signal is 200, and a grayscale of a certain pixel point is 100, then a luminance output to the certain pixel point by the laser light source 1 is $I_{max} \times \frac{1}{2}$, and a luminance output to the certain pixel point by the LCD modulator is $I_b = 255 \times \frac{100}{200}$.

It can be understood that the gray level of the LCD modulator 71 is not limited to 8-bit in the present embodiment, and it may be other digits, such as 4-bit, 6-bit, and the like.

In the present embodiment, the grayscale value of the pixel point having the highest luminance is obtained by the maximum value algorithm.

It can be understood that obtaining a grayscale value of the pixel point having the highest luminance is not limited to the maximum value algorithm in the present embodiment, and other algorithms, such as cycle comparison for solving a minimum or maximum value, can be used to obtain the grayscale value of the pixel point having the highest luminance.

According to the algorithm and the modulation process, each of the laser light source 1, the LCD modulator 71 and the spatial light modulator 51 has a certain gray level, and the gray level of the projection system 200 is a product of the certain gray levels of the laser light source 1, the LCD modulator 71 and the spatial light modulator 51, which dynamically improves contrast and realizes projection imaging with a high dynamic range.

The laser illumination device of the present disclosure is provided with a cylindrical lens assembly 2 in an optical path for transmission of the laser light source to converge a non-uniform laser beam into a uniform rectangular laser beam which is converted by a micro-lens assembly 4 so as to converge the diverging laser beam into a parallel laser light beam, and thereby outputting a uniform parallel matrix laser beam. The laser illumination device has a compact structure and a low energy consumption. The projection system 200 of the present disclosure can realize projection imaging of pictures and videos of a high dynamic range and has good economic benefits.

It should be understood by those skilled in the art that the above embodiments are only intended to illustrate the present disclosure and are not intended to limit the present disclosure, as long as changes and modifications made to the above embodiments within the scope of the spirit of present disclosure fall within the scope of the present disclosure.

What is claimed is:

1. A laser illumination device for a projection system, comprising:
   a laser light source;
   a light combining assembly;
   a micro-lens assembly; and
   a plurality of cylindrical lens assemblies,
   wherein the plurality of cylindrical lens assemblies is provided in an optical path for transmission of the laser light source, and the micro-lens assembly is provided on one side of the light combining assembly;
   wherein each of the plurality of cylindrical lens assemblies comprises a first cylindrical lens array and a second cylindrical lens array, and a preset angle of intersection is formed between the first cylindrical lens array and the second cylindrical lens array;
   wherein the laser light source is configured to achieve grayscale output of the projection system for a corresponding pixel point by adjusting luminance of the laser light source; and
   wherein the first cylindrical lens array and the second cylindrical lens array are configured to adjust divergence angles of a laser beam from the laser light source which has a spatial distribution in a shape of rectangle, such that divergence angles of the laser beam with respect to a length direction and a width direction of the rectangle are same.

2. The laser illumination device according to claim 1, wherein the first cylindrical lens array and the second cylindrical lens array are perpendicular to each other.

3. The laser illumination device according to claim 1, wherein the laser light source comprises a red light source outputting red laser light, a green light source outputting green laser light, and a blue light source outputting blue laser light, and the plurality of cylindrical lens assemblies comprises three cylindrical lens assemblies which are respectively provided in the optical path for transmission of the red light source, the green light source and the blue light source.

4. The laser illumination device according to claim 3, wherein a wavelength of the red laser light output by the red light source is 638 nm, a wavelength of the green laser light output by the green light source is 520 nm, and a wavelength of the blue laser light output by the blue light source is 455 nm.

5. The laser illumination device according to claim 1, wherein a focal length of the first cylindrical lens array and a focal length of the second cylindrical lens array are set base on a formula of $$\frac{h_1}{f_1} = \frac{h_2}{f_2},$$

such that divergence angles of the laser beam with respect to a length direction and a width direction of the rectangle are same, wherein $h_1$ is a dimension of the spatial distribution in a shape of rectangle with respect to a length direction, $h_2$ is a dimension of the spatial distribution in a shape of rectangle with respect to a width direction, $f_1$ is the focal length of the first cylindrical lens array, and $f_2$ is the focal length of the second cylindrical lens array.

6. A projection system comprising:
   a laser illumination device, comprising a laser light source, a light combining assembly, a micro-lens assembly, and a plurality of cylindrical lens assemblies, wherein the plurality of cylindrical lens assemblies is provided in an optical path for transmission of the laser light source, and the micro-lens assembly is provided on one side of the light combining assembly, and wherein each of the plurality of cylindrical lens assemblies comprises a first cylindrical lens array and a second cylindrical lens array, and a preset angle of intersection is formed between the first cylindrical lens array and the second cylindrical lens array; and wherein the laser light source is configured to achieve grayscale output of the projection system for a corresponding pixel point by adjusting luminance of the laser light source;
   a diffuser provided in an optical path, along which the laser illumination device transmits a laser beam outwards;
   a square rod assembly provided on one side of the diffuser facing away from the laser illumination device;
   a light modulation assembly; and
   a light relay assembly provided between the square rod assembly and the light modulation assembly;
   an output assembly provided in an optical path, along which the light modulation assembly transmits a modulated laser beam outwards,
   wherein the light modulation assembly is configured to adjust output luminance of the laser light source corresponding to each pixel point in an image signal, and to control the laser light source to achieve grayscale output of the projection system for a corresponding pixel point by adjusting luminance of the laser light source; and
   wherein if a grayscale value of a pixel point having the highest luminance obtained by an algorithm in the image signal obtained by the projection system is A, a maximum value of the luminance of the laser light source corresponding to the pixel point having the highest luminance is $I_{max}$, and a grayscale value of a certain pixel point is a, then a luminance $I_a$ of the laser light source corresponding to the certain pixel point is calculated based on a formula of $$I_a = I_{max} \times \frac{a}{A},$$

to achieve projection imaging of the projection system with a high dynamic range.

7. The projection system according to claim 6, wherein the light modulation assembly is a spatial light modulator.

8. The projection system according to claim 7, wherein the output assembly is an imaging object lens.

9. The projection system according to claim 6, wherein the laser light source comprises a red light source outputting red laser light, a green light source outputting green laser light, and a blue light source outputting blue laser light, the output assembly is a scanning mirror configured to acquire an RGB signal of a certain pixel point in a picture and video signal and the light modulation assembly is configured to control the laser light source in the laser illumination device to output light intensity based on the acquired RGB signal, if an RGB signal of a certain pixel point in a picture and video signal acquired by the scanning mirror is (x, y, z), a maximum light intensity of the red laser light output by the red light source is $I_R$, a maximum light intensity of the green laser light output by the green light source is $I_G$, a maximum grayscale of the laser light source is $I_L$, then a light intensity of the red laser light output by the red light source is $I_R*X/I_L$, a light intensity of the green laser light output by the green light source is $I_G*y/I_L$, and a light intensity of the blue laser light output by the blue light source is $I_B*Z/I_L$.

10. The projection system according to claim 6, wherein the laser light source is of an 8-bit grayscale, and a maximum grayscale $I_L$ of the laser light source is 255.

11. The projection system according to claim 6, further comprising a light recycling assembly, wherein the light recycling assembly comprises an LCD modulator, a PBS plate, a reflector assembly, a half-wave plate, a relay lens and a light combining mirror, wherein the reflector assembly comprises a first reflector and a second reflector, the LCD modulator and the PBS plate are sequentially provided between the square rod assembly and the light relay assembly, the half-wave plate and the relay lens are sequentially provided between the first reflector and the second reflector, and the light combining mirror is provided between the laser illumination device and the square rod assembly.

12. The projection system according to claim 11, wherein if a grayscale of the pixel point having the highest luminance obtained by an algorithm in the image signal obtained by the projection system is A, the maximum luminance that can be output by the laser light source is denoted as $I_{max}$, a maximum grayscale of the LCD modulator is $I_M$, and a gray value of a certain pixel point is a, then a luminance $I_a$ of the laser light source corresponding to the certain pixel point is obtained by calculating based on a formula of $$I_a = I_{max} \times \frac{a}{A},$$

and a luminance $I_b$ of the LCD modulator corresponding to the certain pixel point is obtained by calculating based on a formula of $$I_b = I_M \times \frac{a}{A}.$$

13. The projection system according to claim 11, wherein each of the laser light source, the light modulation assembly and the LCD modulator has a certain gray level, and the gray level that can be achieved by the projection system is a product of the certain gray level of the laser light source, the certain gray level of the light modulation assembly and the certain gray level of the LCD modulator.

14. The projection system according to claim 11, wherein the light combining mirror comprises an AR-coating film and a high-reflective film, and the AR-coating film is embedded in the high-reflective film.

15. The projection system according to claim 6, wherein if a luminance of a pixel point having the highest luminance in the image signal obtained by the projection system is A, a luminance of each pixel point is a, a maximum luminance that can be output by the laser light source is $I_{max}$, and the laser light source is configured to output laser light with a luminance of $I_a$ for each pixel point based $$I_a = I_{max} \times \frac{a}{A},$$

on to achieve projection imaging of the projection system with a high dynamic range.

16. The projection system according to claim 11, wherein the LCD modulator is of an 8-bit gray level, and a maximum grayscale $I_M$ of the LCD modulator is 255.

17. A laser illumination device for a projection system, comprising:
    a laser light source;
    a light combining assembly;
    a micro-lens assembly; and
    a plurality of cylindrical lens assemblies,
    wherein the plurality of cylindrical lens assemblies is provided in an optical path for transmission of the laser light source, and the micro-lens assembly is provided on one side of the light combining assembly,
    wherein each of the plurality of cylindrical lens assemblies comprises a first cylindrical lens array and a second cylindrical lens array, and a preset angle of intersection is formed between the first cylindrical lens array and the second cylindrical lens array,
    wherein the first cylindrical lens array and the second cylindrical lens array are configured to adjust divergence angles of a laser beam from the laser light source which has a spatial distribution in a shape of rectangle, such that divergence angles of the laser beam with respect to a length direction and a width direction of the rectangle are same.

18. A laser illumination device for a projection system, comprising:
    a laser light source configured to emit at least one laser beam;
    a light combining assembly;
    a micro-lens assembly; and
    a plurality of cylindrical lens assemblies,
    wherein each of the at least one laser beam corresponds one of the plurality of cylindrical lens assemblies, the light combining assembly is configured to combine a plurality of laser beams emitted by the plurality of cylindrical lens assemblies, and the combined laser beams are incident to the micro-lens assembly and then is emitted from the laser illumination device;
    $h_1$ is a dimension with respect to a length direction of one of the at least one laser beam, $h_2$ is a dimension with respect to a width direction of the laser beam;
    the plurality of cylindrical lens assemblies is provided in an optical path for transmission of the laser light source, each of the plurality of cylindrical lens assemblies comprises a first cylindrical lens array and a second cylindrical lens array, $f_1$ is a focal length of the first cylindrical lens array, $f_2$ is a focal length of the second cylindrical lens array, and a preset angle of intersection is formed between the first cylindrical lens array and the second cylindrical lens array;

wherein the first cylindrical lens array, the second cylindrical lens array, and the laser beam satisfy:

$$\frac{h_1}{f_1} = \frac{h_2}{f_2},$$

to form a uniform matrix light after the laser beam passes through one of the plurality of cylindrical lens assemblies, such that grayscale output of the projection system for a corresponding pixel point is achieved by adjusting luminance of each of the at least one laser light;

wherein the uniform matrix light has divergence angles of the laser beam in two orthogonal directions and the divergence angles are the same.

* * * * *